Aug. 5, 1924.
H. M. CONGER ET AL
1,504,183
MACHINE FOR MANUFACTURING GELATIN SHEETS OR FILMS
Filed June 30, 1921    3 Sheets-Sheet 1
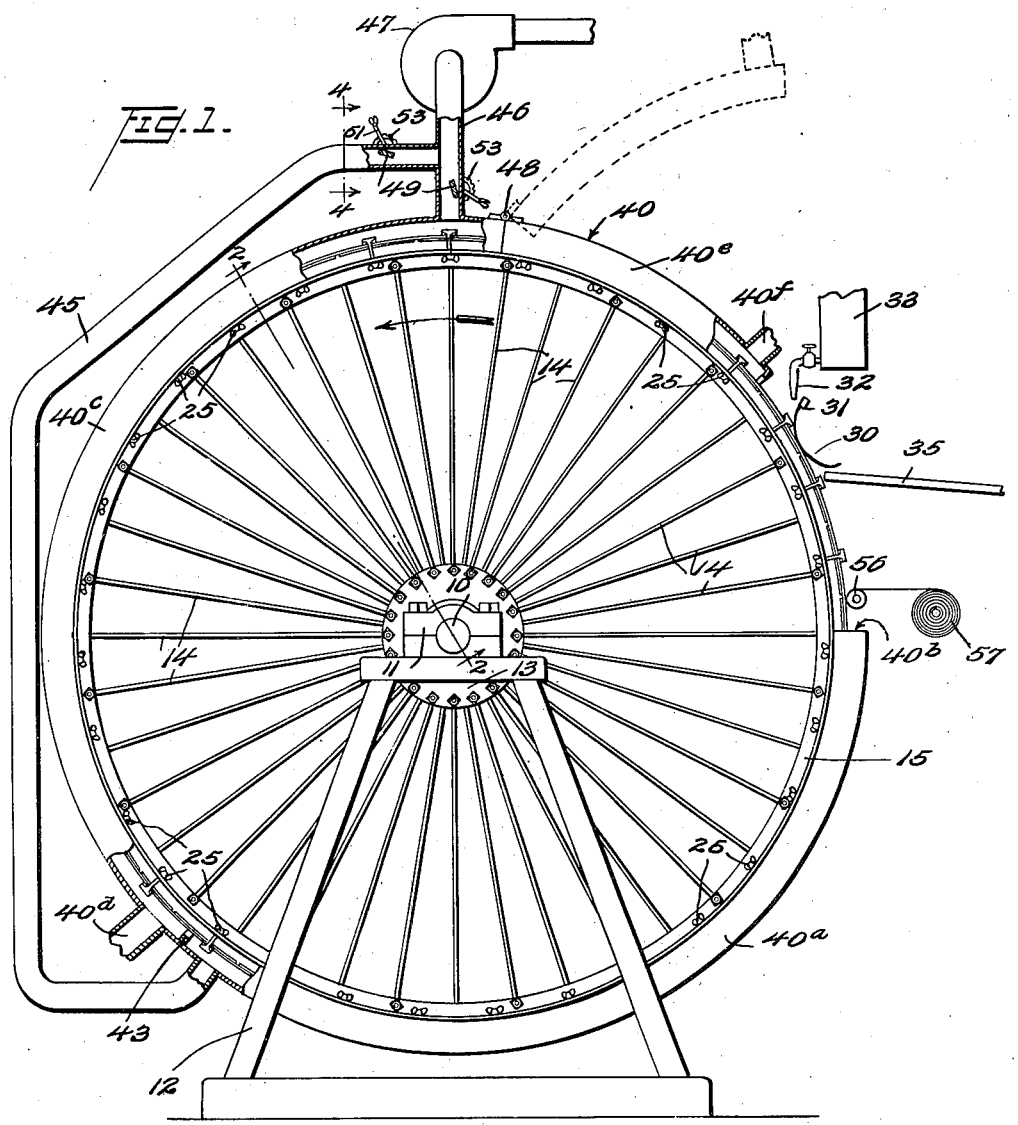
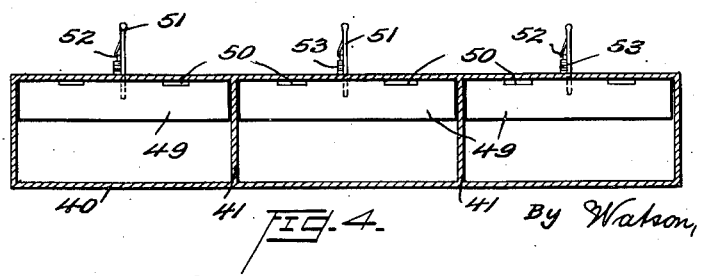
Inventor
A. O. Travis,
H. M. Conger,
By Watson, Coit, Morse & Grindle,
Att'ys

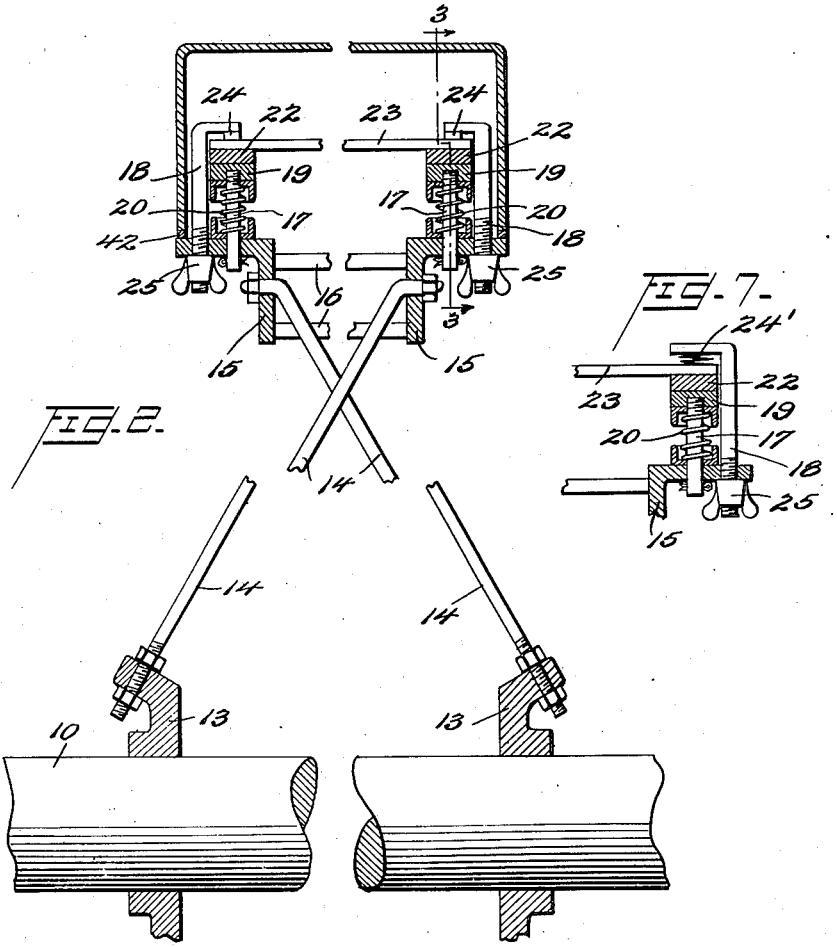
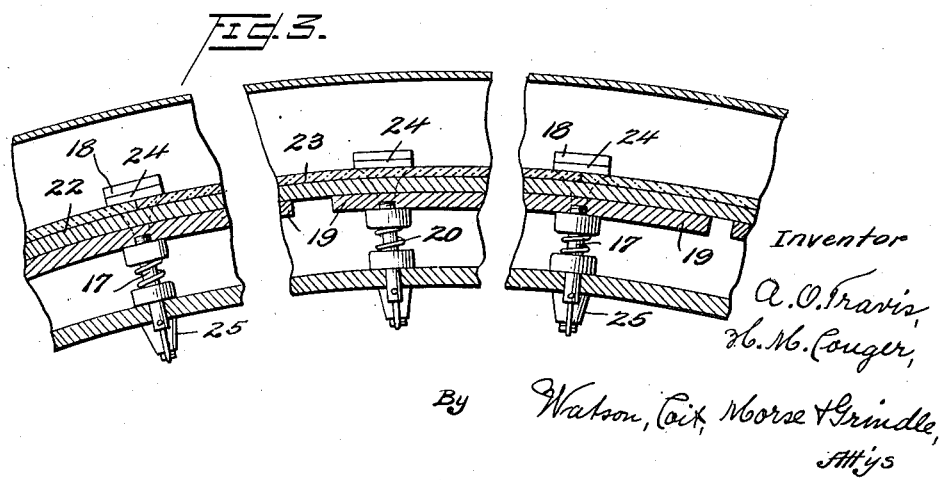

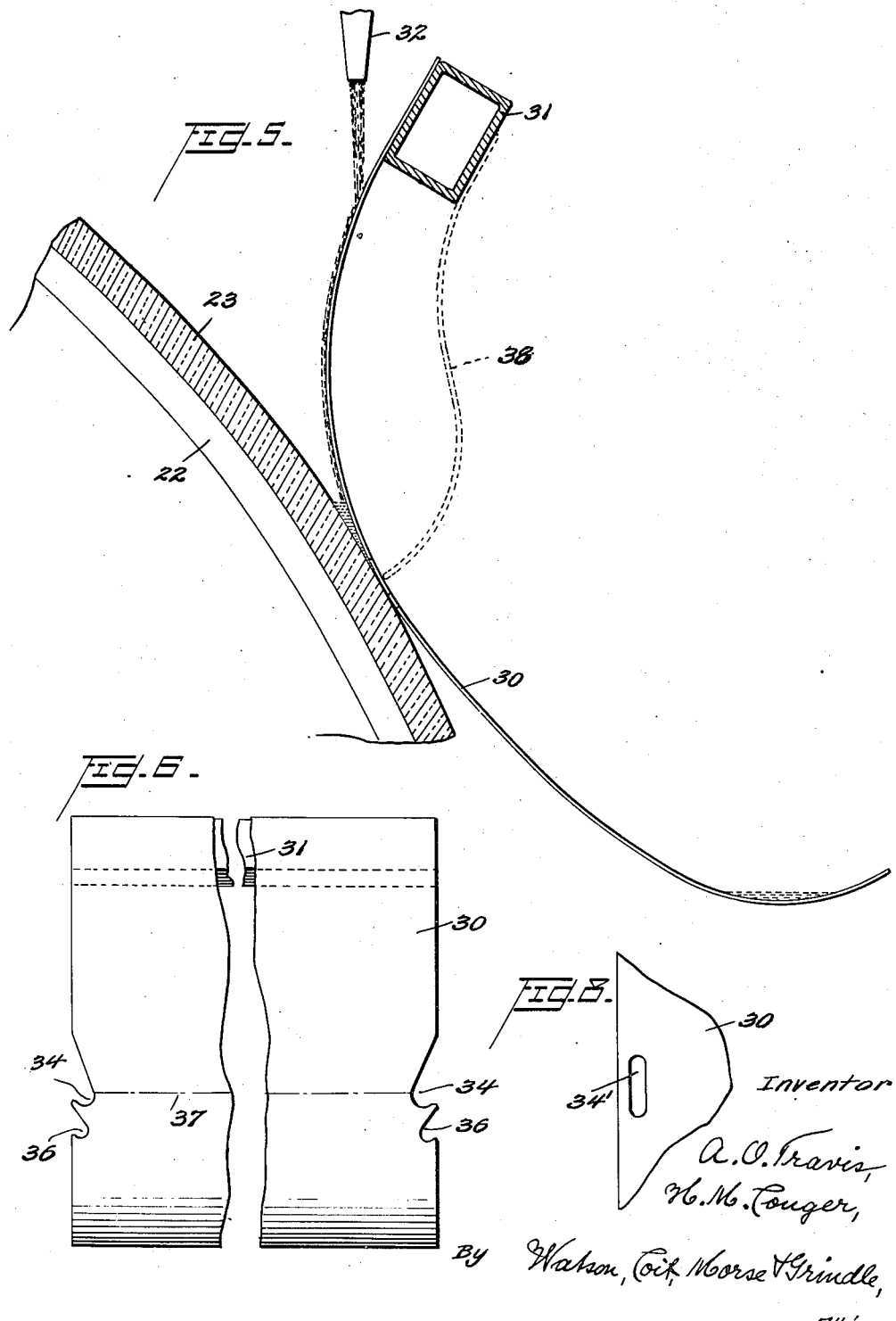

Patented Aug. 5, 1924.

1,504,183

UNITED STATES PATENT OFFICE.

HENRY M. CONGER, OF WASHINGTON, DISTRICT OF COLUMBIA, AND ASHER O. TRAVIS, OF DEL RAY, VIRGINIA, ASSIGNORS, BY DIRECT AND MESNE ASSIGNMENTS, TO SEATTLE LUMINOUS PRODUCTS CORPORATION, OF SEATTLE, WASHINGTON.

MACHINE FOR MANUFACTURING GELATIN SHEETS OR FILMS.

Application filed June 30, 1921. Serial No. 481,586.

*To all whom it may concern:*

Be it known that we, HENRY M. CONGER and ASHER O. TRAVIS, citizens of the United States, and residing at Washington, District of Columbia, and Del Ray, Virginia, respectively, have invented certain new and useful Improvements in Machines for Manufacturing Gelatin Sheets or Films, of which the following is a specification.

The present invention relates to apparatus for producing sheets or films of cellulose or gelatinous material. While particularly adapted for use in making this transparent or translucent sheet for decorative purposes, such as for wrappings for candy boxes, it may be used for forming many other products, such as camera films, etc.

It has long been realized that in forming camera films or gelatinous or cellulose films in general, it is necessary in order to obtain a flawless film to spread the emulsion upon a surface which is practically free from blemishes. Flat glass plates have been used for this purpose, the compound or emulsion being spread by devices of different kinds, upon the horizontal upper surfaces of such plates. Films formed in this manner have been substantially clear and free from defect but naturally the process is not a continuous one, it being necessary, after each plate has been covered to wait for the film thereon to dry before it can be removed and a new film spread thereon. It has also been suggested that in place of flat glass plates an endless metal belt be utilized, this belt travelling slowly and continuously past the spreading device and having drying means associated therewith, so that the film is dried before it can again reach the spreading device, and may be removed. A defect of such metal belt film forming machines is that it is practically impossible to maintain the surface of the belt free from blemishes, such as scratches. These scratches, no matter how small, cause white lines to appear on the surface of the finished film, and when the scratches are present in great numbers, the film will show a network of scratches which greatly detracts from its utility, especially in the manufacture of camera films. A further defect of such metal belts is that they require polishing and lubricating after the completion of each cycle, that is, as soon as the film has been removed the section on which it was formed must be polished and lubricated before again passing under the spreading device.

It is an object of the present invention to provide an apparatus for forming films of this character in which the advantage of having a continuously moving surface to receive the emulsion and the advantage of having this surface of glass, are both realized. To this end, we form the receiving surface for the emulsion as a coating of glass or vitreous material on the outside of a support rotatable about a fixed axis, and provide a relatively-fixed spreading device for continuously coating the glass periphery of of the wheel with emulsion as it moves by. The glass wheel has numerous novel features of construction. The wheel is so designed that the expansion and contraction of the glass surface, due to changes in temperature, is automatically taken care of. The glass surface is formed of a plurality of short, curved sections accurately joined together and removably secured to the frame. One or more of these sections may be removed readily at any time so that broken sections may be easily replaced or a section having a plain surface may be removed and replaced by a section having figures or designs engraved thereon, which designs it is desired should appear in the resulting product.

Another novel feature of the invention resides in the device for spreading the emulsion upon the surface of the glass. The wheel itself necessarily travels at a certain fixed peripheral speed, at which speed the spreading of the film is most efficiently performed. The wheel, therefore, is of large diameter, so that the circumference will be of such length that the film will have had ample time to dry before reaching the point at which it is to be removed. As the glass surface may be made of considerable width and as it is extremely difficult to form commercially curved glass plates with perfectly cylindrical surfaces, it is necessary that the spreading device be of the compensating type, accommodating itself not only to backwards and forwards movement of the glass surface such as would occur were such surface not exactly concentric with its axis of rotation, but also to accommodate itself to local unevenness of surface, such as warped plates either due to imperfect plates of glass or to inaccurate fastening of the glass to the wheel. It is important that the receiving surface be coated by the spreading device with a coat of uniform thickness transversely, and to this end the apparatus is designed so that the receiving surface slowly passes a pool of the emulsion and picks up the emulsion from this pool. This pool is formed between the spreading member and the glass receiving surface, the emulsion flowing from a suitable receptacle above the spreader and down the surface thereof to the V-shaped space between the glass surface and the spreader. An excess of emulsion is provided and the portion which is not used flows out at the ends of the V-shaped space and down the reverse side of the spreader, novel collecting notches being formed in the spreading plate at its ends through which the excess liquid passes to the rear of the plate. The spreading plate is of thin flexible material preferably sheet metal.

Still another novel feature of the invention resides in the means for treating the film with air as it hardens on the surface of the wheel, either for treating it with heated dry air to dry the film quickly, or with moist air to prevent too rapid drying of the film, the exact treatment depending upon the composition of the emulsion, the temperature, and atmospheric conditions in general. This means also contemplates the variations in the treatment of different longitudinal sections of the film. It has been found in belt machines that the outside layers of the film dry more quickly than the center longitudinal section and it is necessary therefore to provide means whereby the central longitudinal portion of the film may be given a different treatment from the side sections so that the resulting film is uniform in texture. The film treating means is also divided into units circumferentially of the wheel so that different treatments may be given different segments of the film, depending upon its position on the wheel relatively to the spreading device and the point of removal. Thus it may be treated with warm dry air to dry it and afterwards with moist air if found necessary, to prevent cracking.

Other novel features and advantages of the invention will become apparent to those skilled in the art as it is disclosed, and it will be obvious that numerous changes may be made within its scope, the invention not being limited to that embodiment which is herein disclosed.

In the drawing:

Fig. 1 is a side elevation, partly broken away, of the complete film forming apparatus;

Fig. 2 is a section on line 2—2 of Figure 1;

Fig. 3 is a section on line 3—3 of Figure 2;

Fig. 4 is a section on line 4—4 of Figure 1;

Fig. 5 is a large scale section through the spreading device and portion of the receiving surface;

Fig. 6 is a front elevation, partially broken away, of the spreading device;

Fig. 7 is a section through a portion of the wheel showing a modified clamping device for securing the glass thereto; and Fig. 8 is a front elevation of portion of a modified form of spreading device.

The shaft 10 of the wheel is rotatably mounted in bearings 11 supported on frames 12 resting upon the ground or a suitable solid base, and fixed on this shaft are spaced hub members 13 which are connected to a concentric rim by spokes 14, the rim of the wheel comprising oppositely facing rings 15 held in fixed spaced relation by bars 16, each of these rings being formed of angle iron, and the rings being arranged with parallel flanges, to which bars 16 are secured, and aligned flanges, to which the glass receiving surface is attached.

As shown in Figures 2 and 3 the aligned flanges of angle members 15, the outer surfaces of which lie in a cylindrical surface having for its center the axis of shaft 10, are perforated at intervals for the passage of radially disposed bolts 17 and 18. Bolts 17 freely slide in the apertures provided in members 15 and are secured at their outer ends to the circumferential members 19 which are short arc-shaped pieces having as a common center the axis of shaft 10, in other words, being concentric with the rim of the wheel. Springs 20 surround bolts 17 and normally press outwardly on members 19, cup shaped abutments being provided to receive and hold the ends of the springs.

A circular band of thick felt or similar material 22 lies outside of each series of members 19 and on these bands are supported the lateral margins of the arc-shaped glass plates 23, which are also centered about the axis of shaft 10, and the outer surfaces of which are as truly circular as possible to obtain. The glass plates are retained in position by the L-shaped bolts 18 which extend substantially radially but have inwardly extending arms which rest upon pads 24 of felt, rubber or similar material which bear on the glass plates.

These pads, while supporting the glass firmly, may be compressed somewhat in case the glass should expand relatively to the rim members 15. Bolts 18 move freely radially relatively to members 15 and wing nuts 25 are provided for adjusting the positions of the bolts and limiting their outward movement. If desired felt or rubber pads 24 may be replaced by springs, as illustrated at 24' in Figure 7.

From the above description it will be seen that the cylindrical glass receiving member, which is made up of sections 23 of glass having the desired radius is mounted substantially on a floating bed. The wheel is necessarily of large size, being in some instances about 30 feet in diameter and the floating bed allows the rim and glass coating to expand and contract independently due to changes in temperature, without causing breakage of the glass which would occur were the glass rigidly secured to the rim of the wheel, the coefficience of expansion of glass and metals being different.

The glass plates may have different lengths and we contemplate using plates about 5 or 6 feet long with the present apparatus, in which the diameter of the wheel may be 30 feet. The abutting ends of the glass plates are carefully ground and tightly fitted together. Section of the glass may be removed by simply loosening the bolts 18 which maintain such section in position, a plurality of these bolts being provided for each section, pairs of oppositely placed bolts being provided to secure the ends of the section to the rim and intermediate bolts being provided to firmly fasten the section to the rim between its ends. The glass sections may be either plain or may have designs formed thereon by engraving, sand blasting or other methods, which designs will appear in the finished film. Names and portraits as well as flowers and conventional designs may be used.

While we have shown a wheel built up of sections, it will be realized that it is preferable to have a wheel having a solid glass surface without joints and where the wheel is of relatively small diameter it is possible to provide such an integral glass surface which will be so mounted as to allow for its expansion and contraction relative to the supporting rim, as in the present instance. Also other materials than glass may be utilized provided such materials provide the necessary smoothness of surface.

The spreading device is shown in Figures 1, 5 and 6 and comprises essentially a flexible sheet 30 of large size which is adapted to be secured at its upper end to a horizontally extending tube 31 which is adjustably supported (by means not illustrated) for movement circumferentially and radially of the wheel. The sheet 30 is flexible being formed of sheet metal, hard rubber, or other similar material which is both flexible and impervious to the passage of liquid. Thin sheet copper is a suitable metal for such use where it has sufficient springiness. The supporting tube 31 is turned so that the sheet 30 bears lightly against the glass surface of the wheel, as shown in Figure 5, and the emulsion flows in a relatively fine stream from a tube 32 supplied from a tank or container 33 positioned above the sheet 30, the stream of emulsion striking the inclined face of the spreading plate and running down to form a pool in the V-shaped space between the plate 30 and the glass surface.

The emulsion in this space runs laterally, the tube 32 being disposed centrally of plate 30. As excess of the emulsion is supplied a small quantity runs out at the ends of the trough and passes through notches 34 to the rear side of sheet 30 and thence down the sheet to its trough-like lower end where it is collected, and the overflow from which is caught by collecting trough 35 and carried to the side. Additional notches 36 are positioned below notches 34 so that the overflow will at all times be caught and transferred to the rear side of the spreading plate even when the line of contact of the plate with the glass cylinder varies due to eccentricity of the glass cylinder. Normally the line of contact of spreading plate and cylinder is as indicated at 37 in Figure 6, but this line may move vertically either upwardly or downwardly if the glass surface is not concentric with the shaft 10. Additional notches may be provided, or the sheet may be apertured instead of notched as at 34' in Figure 8.

In the operation of the device warm water is passed through the tube 31 to heat the upper end of spreading plate 30 and by conduction this heat passes downwardly to maintain the temperature of the plate where it contacts with the glass cylinder at the proper degree. By regulating the amount of heat transmitted in this manner, the exact temperature of the spreading plate to secure the most efficient spreading of the emulsion may be realized.

The springy plate 30 maintains contact with the glass surface at all times and is not only bendable to compensate for back and forth movement of the glass cylinder due to a possible eccentric mounting but also adjusts itself for local unevenness of surface of the glass. For instance, a glass plate may be warped or have a raised portion and in this case the spreading plate will flex transversely as well as longitudinally to maintain contact at all times notwithstanding such local unevenness. If desired, where the spreading plate is quite thin and wide, one or more, spring fingers, as indicated in dotted lines at 38, may be provided, these spring fingers bearing lightly against the rear face of the plate to maintain it in contact with the glass.

The spreading plate being impervious to liquid it insures against the separation of the emulsion or gelatinous composition into its constituent parts. In certain types of former devices some ingredients, such as mu-cin, were absorbed by the spreading device which was formed of absorbent material such as fabric, the fabric acting as a wick, taking in the mu-cin which is thin and mucilaginous, conducting the same to the receiving surface prior to the spreading of the remainder of the gelatin and thereby causing the film to stick tightly to such surface. Because of this tendency on the part of the film to stick to the receiving surface, it has been found necessary to lubricate such surface constantly and the lubricating means, unless it operates perfectly, which is rare, often causes portions of the receiving surface to be lubricated and other portions unlubricated so that the film adheres in spots to the receiving surface. The glass receiving surface of the present apparatus requires no lubrication and neither does it require the application of a polishing device so often necessary in belt machines.

It will be seen that the spreading plate 30 will operate satisfactorily in different positions, in other words, it may be located horizontally opposite shaft 10, or it may be raised so as to be located at a position approximately 45° from horizontal position. In practice its position will be dependent upon the character of the compound being supplied, and upon the size of the wheel. It is desirable to avoid vertical travel of the emulsion in its green condition as in such cases, the compound will run down the surface of the wheel causing the film to be excessively thin. When the spreading device is arranged at 45° to the horizontal, the lift is relatively small and the slope gentle so that there is little tendency of the newly applied emulsion to flow back toward the spreading device.

Surrounding the greater portion of the periphery of the wheel is a casing 40 substantially rectangular in cross section and divided by longitudinal partitions 41 into three circumferential passages. This casing is stationary, its inner edges being provided with felt strips 42 which make light contact with the angle irons 15 of the rim, as shown in Figure 2. The casing extends substantially around the wheel, but is divided by a transverse partition 43 into two non-communicating segments. Through the first segment 40ª air which enters at 40ᵇ is adapted to pass this air being conducted by pipe 45 to a second pipe 46 connected to the intake of a suction fan or blower 47. Air is adapted to enter the second section 40ᶜ at 40ᵈ and passes to the blower 47 through pipe 46. A third section 40ᵉ is hinged to the main portion of the casing at 48 and may be swung upwardly, as shown in dotted lines in Figure 1, so that access may be had to the glass plates for adjustment or removal. Air is adapted to enter this part of the casing at 40ᶠ and also to be drawn therefrom by the suction fan 47 through pipe 46.

As before stated, the entire casing is divided by longitudinal partitions 41 into three sections so that the air passing therethrough is divided into three separate streams. These partitions 41 terminate only a short distance from the receiving surface of the wheel but in no case are they close enough to such surface to touch the same and injure the film. Each longitudinal passage is controlled by a valve so that the flow of air therethrough can be regulated at will. In Figures 1 and 4 these valves are clearly illustrated. In Figure 4 one set of these valves is shown, each valve comprising a flat plate 49 hinged to the casing at 50 and having a handle 51 extending through a slot in the casing so that it may be manipulated from the outside. A spring latch 52 is secured to the handle and adapted to cooperate with the notched segment 53 to maintain the handle and valve in any desired adjustment. The middle portion of the film frequently dries more slowly than the edges or margins and by adjusting the valves the relative rate of flow through the middle and side compartments may be so regulated that the film is dried uniformly. As shown in Figure 1, one set of valves is provided for regulating the air flow from segment 40ª and a second set is provided for regulating the flow through segments 40ᶜ and 40ᵉ.

It will be noted that the wheel rotates in the direction of the arrow (Figure 1) and that the air passing through the casing flows in the opposite direction so that the air entering either of the segments except segment 40ᵉ will contact with a relatively dry surface of the film and as it flows toward the blower will contact with film surfaces which are increasingly moist. Passing air from dry to wet surfaces in this manner proves more efficient than when the direction of air flow is reversed. The air flowing rapidly along arcuate paths tends to throw its moist and heavy particles toward the outside or away from the surface of the film which of course promotes rapid drying in that the dry air is correspondingly forced toward the film.

The air circulating casing is divided into segments so that the air introduced at 40ᵇ need not pass entirely around the wheel but a fresh supply of air may be introduced at an intermediate point, as for instance, at 40ᵈ as illustrated. This promotes rapidity of drying and the casing may be divided into still other segments if found necessary or desirable. Furthermore in some instances it is necessary to treat the film with moist air toward the end of its travel on the wheel in tempering or softening the same where it has been thoroughly dried after moving only part of its total travel, and in such instances moist air will be introduced at $40^b$ instead of heated air or air under atmospheric conditions. In ordinary and usual operations of the apparatus heated air will be introduced at $40^b$, $40^d$ and $40^f$, but the temperature and moisture content of the air so introduced is varied within wide limits, depending upon the nature of the compound being used and the atmospheric conditions.

The finished film passes from the open end $40^b$ of the casing 40 and over a guide roller 56 to winding device 57 of any well known type on which the film is coiled. It may then be cut into strips or figures of desired size.

By means of this invention a film of not only perfect surface is obtained but one of pure chemical composition. Some compounds or compositions used in the manufacture of transparent films contain elements which injuriously effect metal surfaces and some compositions are themselves injured by contact with certain kinds of metal surfaces due to exudations of poisonous matter from such surfaces. It is important to have an absolutely chemically pure film for certain purposes, for instance for meat inspection labels, and the present machine will provide such a film in quantity.

The open-ended spreading plate is an important feature of the apparaus, as it allows an excess of emulsion to be provided so that a pool is formed between the wheel and the spreading device. This insures a proper spreading of the film on the glass, the resulting film being of uniform thickness and consistency. It is only possible to utilize an open ended spreading plate of this kind when means is provided for conducting the overflow away from the receiving surface. The spreading plate shown and described conducts the excess of emulsion away from the wheel even when it is positioned high above the horizontal axis of the wheel into which position it is preferably placed to cut down as much as possible the vertical travel of the green film. The travel of the drying air over the green film is upwardly through casing $40^e$ and in the direction of travel of the film so that it will not have a tendency to cause backflow of the emulsion toward the spreading device.

In prior spreading devices without provision for compensating for inequalities of surface of the receiving element, a considerable pressure has been exerted thereon at the line of contact which often causes the spreading plate or device to destroy the uniform lubrication of the receiving surface. If the material of the spreader at its point of contact is soft or absorbent it has a tendency to gather the foreign matter from the passing lubricated surface, and this foreign matter as it hardens forms an uneven line of contact which results in a scraping of the lubricated surface which results in adherence of the film to the receiving surface at such points. The present spreader bears but lightly against the receiving surface, and being non-absorbent, gathers no foreign matter.

It is believed that the advantage of our invention will be apparent to those skilled in the art and its mode of operation found clear. Obviously numerous changes may be made in the design and arrangement of parts and the inventon is not limited to the structure described and illustrated by way of example, which structure is illustrated largely diagrammatically.

Having thus described the invention, what we claim as new and desire to secure by Letters Patent is:

1. An apparatus of the class described, in combination, a rotatable support, a member having a receiving surface of glass or similar material detachably secured to said support, and means for spreading a gelatinous substance on said surface.

2. An apparatus of the class described, in combination, a rotatable support, an arc-shaped member having a receiving surface of glass or similar material detachably secured to said rotatable support, the center or curvature of said member being on the axis of rotation of said rotatable support, and means for spreading a gelatinous substance on said surface.

3. An apparatus of the class described, in combination, a rotatable support, a plurality of members secured to said support, each having a receiving surface of glass or similar material and together comprising a continuous band, and means for spreading a gelatinous substance on the surface of said band.

4. An apparatus of the class described, in combination, a rotatable support, a plurality of members, each detachably secured to said support and together comprising a continuous band, the surfaces of said members being of glass or similar material, and means for spreading a gelatinous substance on said surface.

5. An apparatus of the class described, in combination, a rotatable support, a continuous band of glass or similar material, and means for detachably securing said band to said support.

6. An apparatus of the class described, in combination a rotatable supporting member, a continuous band of glass or similar material for receiving a gelatinous substance, and means for securing said band to said support for limited movement radially relative thereto.

7. An apparatus of the class described, in combination, a rotatable support, a continuous band of glass or similar material for receiving a gelatinous substance, resilient means interposed between said band and support, and normally maintaining them in spaced relation, and means including a resilient member for normally limiting the outward movement of said band.

8. An apparatus of the class described, in combination, a rotatable support, a continuous band of glass or similar material, resilient means connecting said band and support, whereby the former is floatingly mounted on the latter, and means for spreading a gelatinous substance on said band.

9. In an apparatus of the class described, in combination, a moving receiving surface, a thin resilient sheet constituting a spreading member, and a support for said spreading member spaced from said receiving surface, said member being so held by said support as to extend toward and contact with the receiving surface along a line intermediate the ends of said member, and said member automatically conforming to any irregularities of the receiving surface due to its resilience.

10. In an apparatus of the class described, in combination, a moving receiving surface, a thin resilient sheet constituting a spreading member, said sheet being composed of a material impervious to liquid, and a support for said spreading member spaced from said receiving surface, said member being so held by said support as to extend toward and contact with the receiving surface along a line intermediate the ends of said member, and said member automatically conforming to any irregularities of the receiving surface due to its resilience.

11. In an apparatus of the class described, in combination, a moving receiving surface, a thin resilient sheet constituting a spreading member, a support for said spreading member spaced from said receiving surface, said member being so held by said support as to extend toward and contact with the receiving surface along a line intermediate the ends of said member, and said member automatically conforming to any irregularities of the receiving surface due to its resilience, and means for introducing a gelatinous substance into the space between said receiving and spreading members, above the mutual line of contact.

12. In an apparatus of the class described, in combination, a moving receiving surface, a thin spreading member of resilient sheet metal, and a support for said spreading member spaced from said receiving surface, said member being so held by said support as to extend toward and contact with the receiving surface along a line intermediate the ends of said member, and said member automatically conforming to any irregularities of the receiving surface due to its resilience.

13. An apparatus of the class described, in combination, a movable member having a receiving surface for gelatinous material, a spreading member in the form of a sheet, normally making contact with said receiving member along a substantially horizontal line, and said spreading member having marginal perforations adjacent the ends of said line of contact.

14. An apparatus of the class described, in combination, a member having a receiving surface, a device for spreading gelatinous material on said surface, including a sheet normally making contact therewith along a horizontal line, said sheet having marginal notches adjacent the ends of said line, and means for introducing a gelatinous substance between said receiving member and spreading member and above the line of contact, the excess substance flowing through said marginal notches to the reverse side of said spreading device.

15. An apparatus of the class described, comprising in combination, a rotatably mounted support having a cylindrical receiving surface thereon, a casing for conducting air along said receiving surface, and means dividing said casing into segments, for the purpose set forth.

16. An apparatus of the class described, comprising in combination, a rotatably mounted support having a cylindrical receiving surface thereon, a casing for conducting air along said receiving surface, and means dividing said casing into segments, one portion of one of said segments being removable, for the purpose set forth.

In testimony whereof we hereunto affix our signatures.

HENRY M. CONGER.
ASHER O. TRAVIS.